United States Patent Office 3,122,499
Patented Feb. 25, 1964

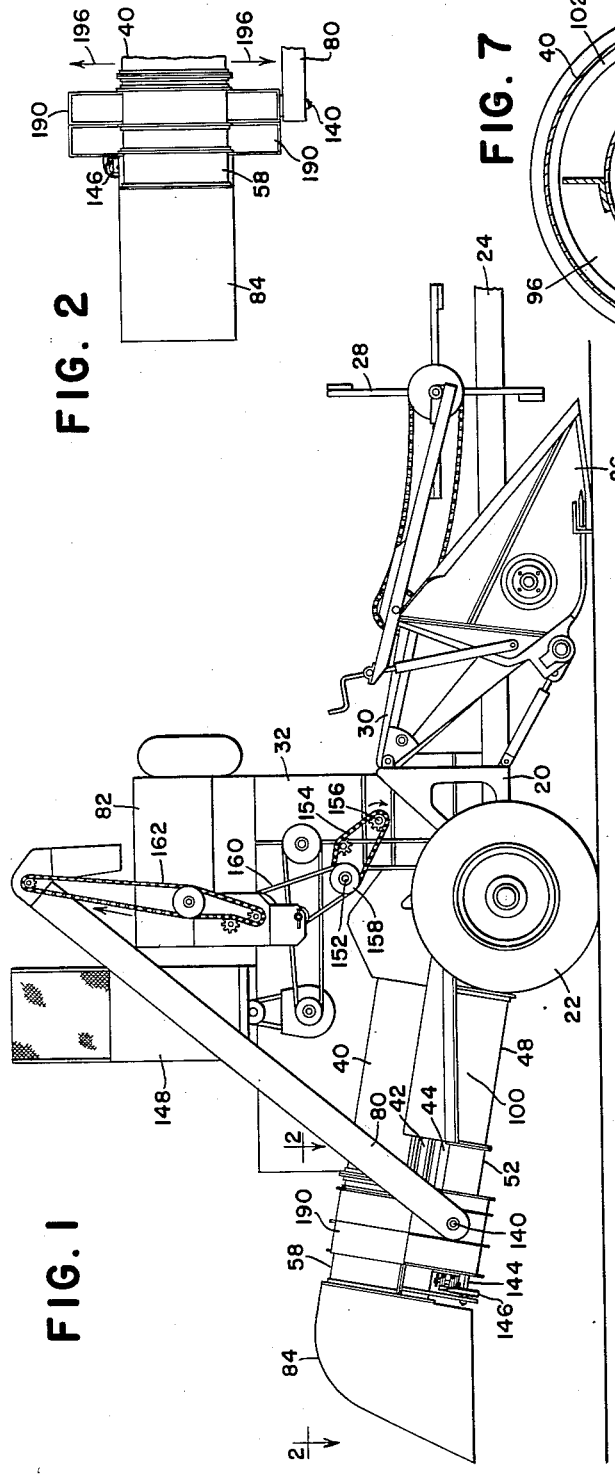

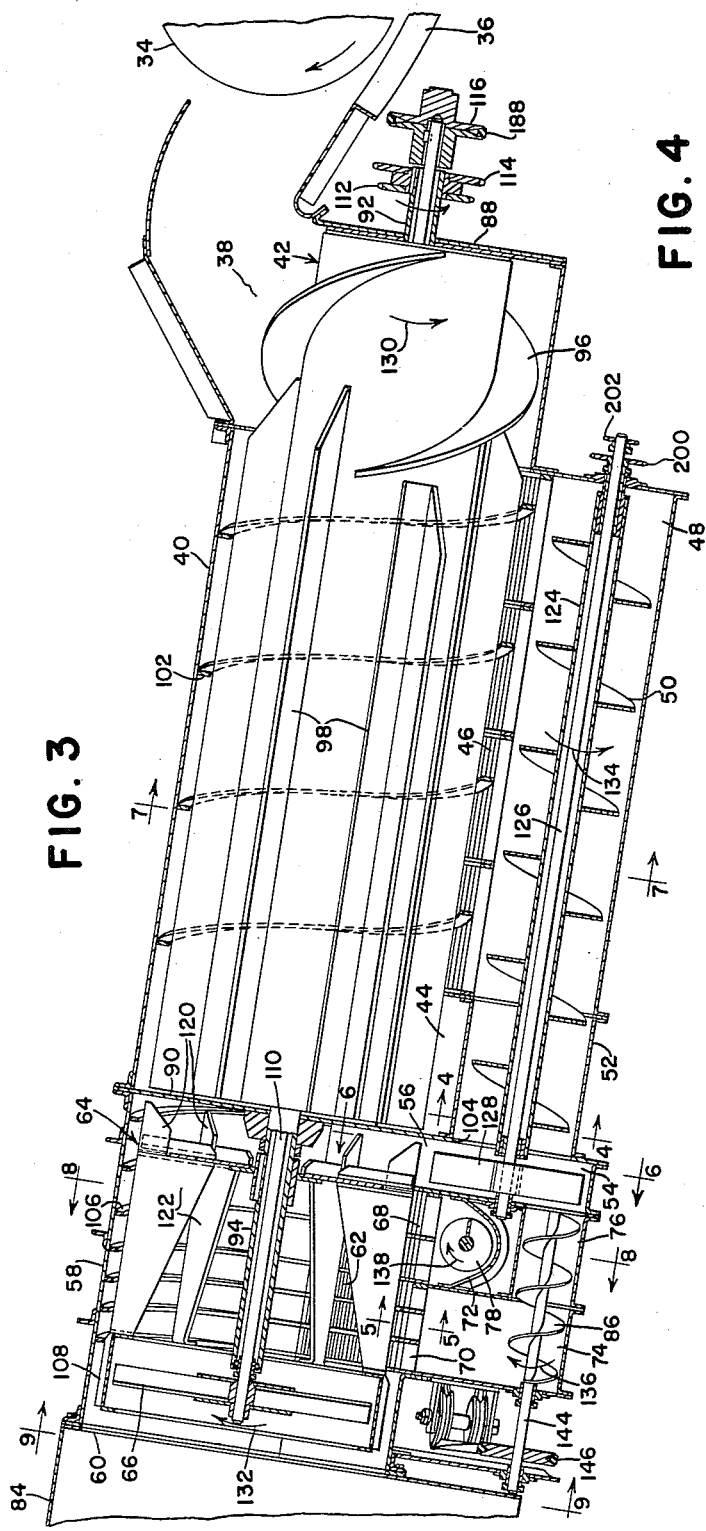
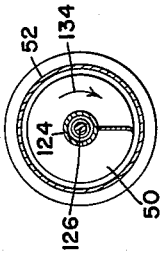
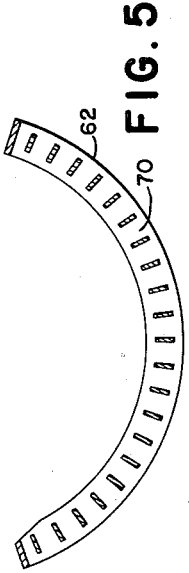

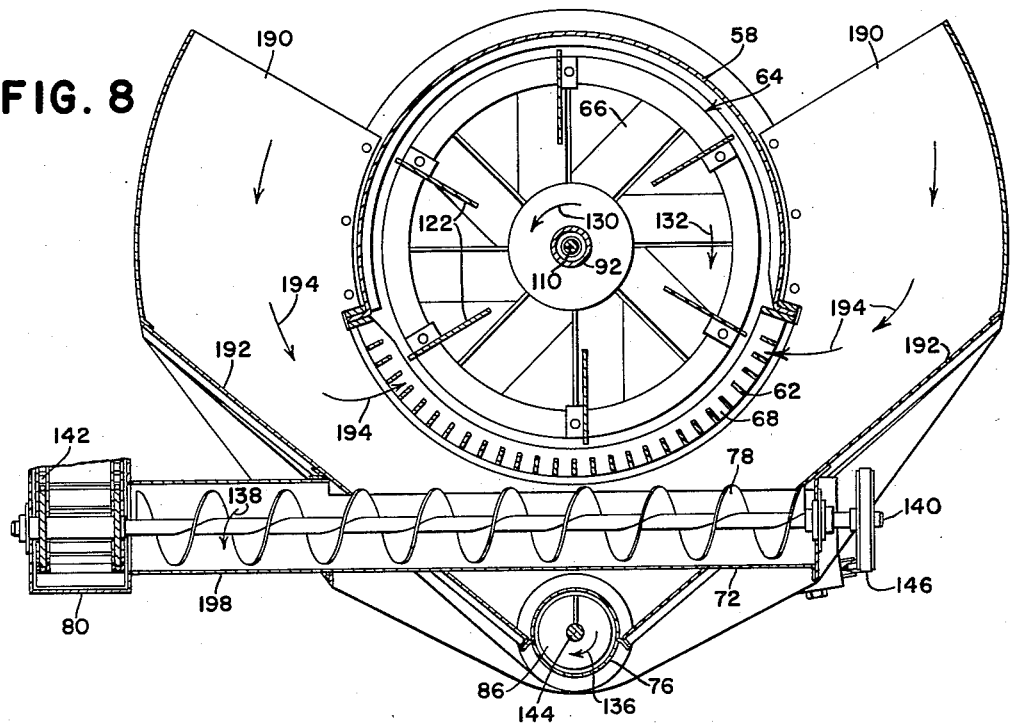
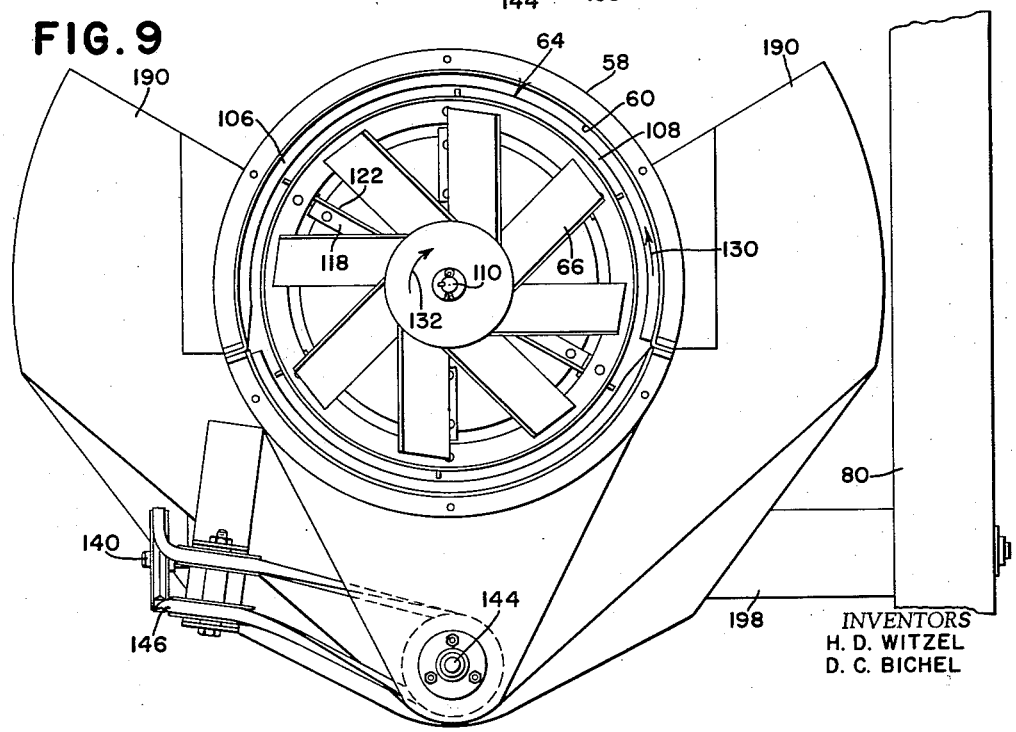

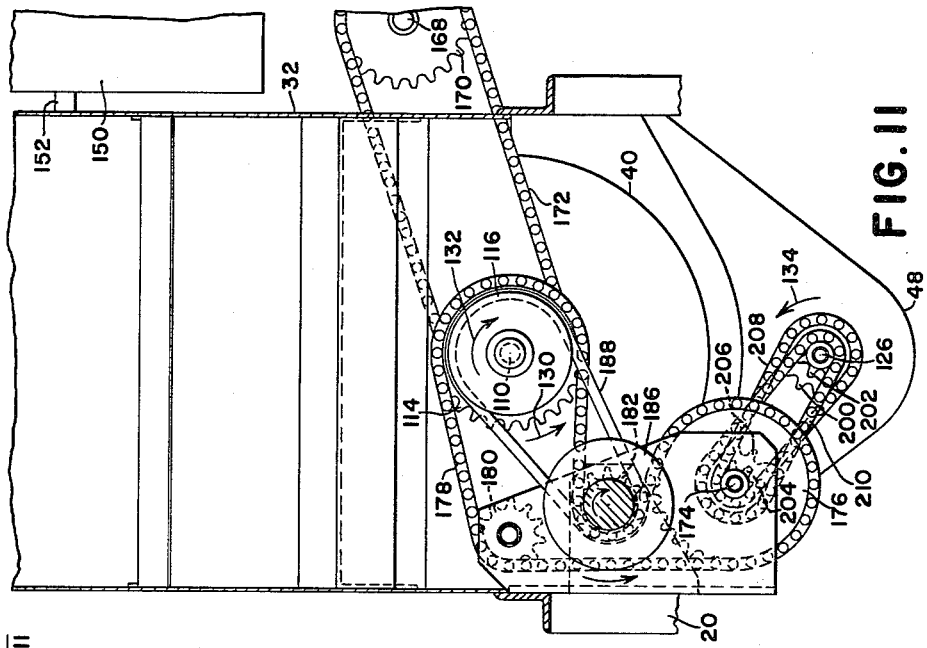
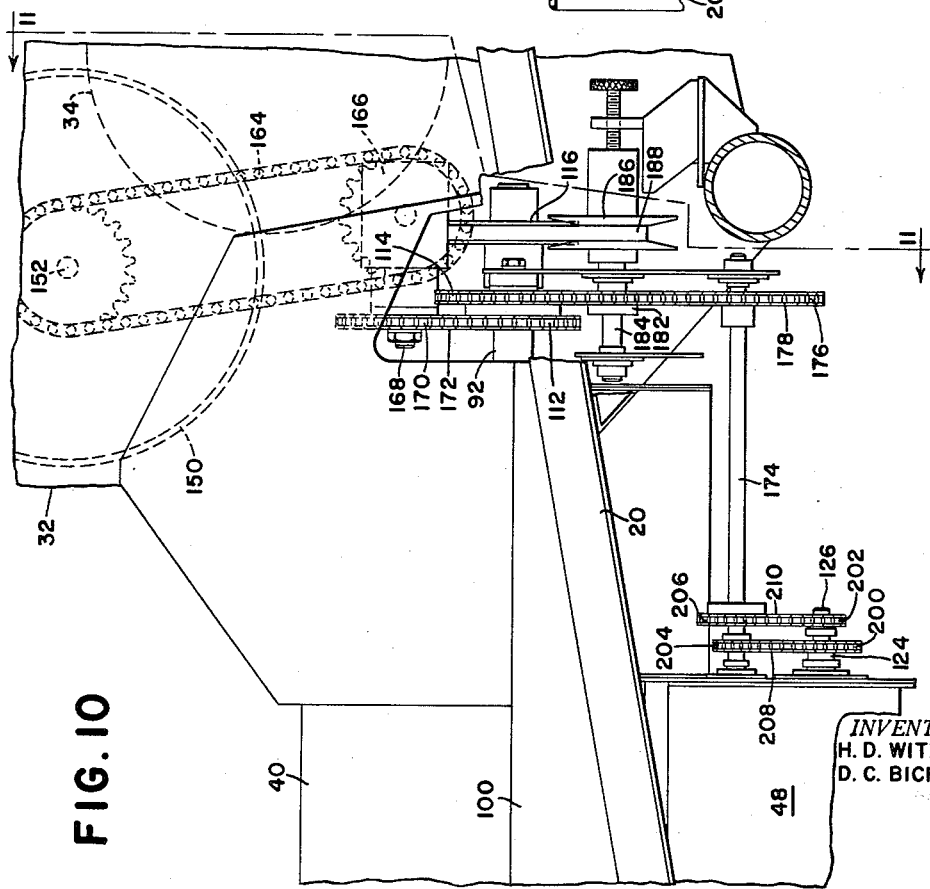

3,122,499
SEPARATOR FOR COMBINE
Homer D. Witzel, Bettendorf, Iowa, and Darwin C. Bichel, East Moline, Ill., assignors to Deere & Company, Moline, Ill., a corporation of Delaware
Continuation of application Ser. No. 114,279, May 23, 1961, which is a continuation of application Ser. No. 784,672, Jan. 2, 1959. This application Aug. 16, 1962, Ser. No. 218,214
37 Claims. (Cl. 209—21)

This invention forming the subject matter of this application, which is a continuation of application Ser. No. 114,279, filed May 23, 1961 (now abandoned), as a continuation of application Ser. No. 784,672, filed January 2, 1959 (also now abandoned), relates to the separation and cleaning of grain and similar crops and pertains more particularly to separating and cleaning mechanism of the so-called axial-flow type.

In the conventional combine, for example, the grain and similar crop is harvested, fed to a threshing cylinder and thence is treated by straw walkers, chaffers, and the like, the main components of which involve reciprocating parts. For many years, the farm machine industry has adhered to this and allied principles of threshing and separation although a few ventures were made into the axial-flow field, albeit without commercial success, which is attributable to many reasons, among which are high cost, inefficiency in separation, lack of adaptability to various crops and so forth.

According to the present invention these disadvantages are eliminated by a simple application of novel principles of separation combined with sound and tried principles, embodied in a simple and inexpensive apparatus which is of uncomplicated design and compact construction. It is a feature of the invention to utilize the separating and cleaning mechanism in conjunction with the conventional threshing mechanism already known, such as the rotating cylinder; although, broadly, the separating and cleaning mechanisms may be fed directly or via any other suitable pre-cleaning or other means. The invention features primarily rotating parts in place of reciprocating parts, thereby eliminating expensive structure, undue vibration and the like and reduces the size of the machine in proportion to its capacity. Moreover, the cylindrical type of separating and cleaning mechanism lends itself to use in combines for hillside operation.

The foregoing and other important features and desirable objects inherent in and encompassed by the invention will become apparent as a preferred embodiment thereof is disclosed, by way of example, in the ensuing description and accompanying sheets of drawings, the several figures of which are described below.

FIG. 1 is a small-scale elevation of a typical combine embodying the improved apparatus.

FIG. 2 is a plan view of the rear portion of the apparatus as seen generally along the line 2—2 of FIG. 1.

FIG. 3 is an enlarged longitudinal section through the separating and cleaning mechanism.

FIG. 4 is a section on the line 4—4 of FIG. 3.
FIG. 5 is a section on the line 5—5 of FIG. 3.
FIG. 6 is a section on the line 6—6 of FIG. 3.
FIG. 7 is a section on the line 7—7 of FIG. 3.
FIG. 8 is a section on the line 8—8 of FIG. 3.

FIG. 9 is a rear view, with a rear hood portion omitted, as seen along the line 9—9 of FIG. 3.

FIG. 10 is a fragmentary enlarged side view of the forward portion of the apparatus, drawn primarily to illustrate the drive therefor.

FIG. 11 is a front view, as seen partly in section, along the line 11—11 of FIG. 10.

The overall machine shown in FIG. 1 is chosen merely for the purposes of illustration, since the improved cleaning and separating apparatus could be used in other machines, such as a self-propelled embodiment, or by itself as a stationary apparatus if desired. The illustrated combine typically comprises a main frame 20 carried on ground wheels, one of which is shown at 22, and equipped with a forwardly extending draft tongue 24 for connection to a tractor or similar draft vehicle. The main frame carries a transverse header or platform 26 with which a reel 28 cooperates in usual fashion to harvest standing grain and like crops. These crops are moved rearwardly through a feeder house 30 and are delivered into the front open end of a main body 32 which includes threshing mechanism and the novel separating and cleaning apparatus to be presently described.

As best shown in FIG. 3, the threshing mechanism may be regarded as represented by a typical threshing cylinder 34 and associated concave 36, by means of which the grain and the like is threshed and delivered rearwardly, the cylinder rotating in the direction of the arrow as indicated. The threshed material enters the forward inlet end 38 of a fore-and-aft cylindrical elongated separator casing 40 and is moved rearwardly in this casing by a coaxial cylindrical and bladed impeller means indicated in its entirety at 42. The rear end of the casing 40 affords a discharge opening 44 from which straw separated from the grain is discharged. The grain passes radially outwardly and downwardly from the casing 40 through a grate-like bottom 46 and into a lower preferably parallel conveyor housing or trough 48 in which a conveyor or auger 50 operates to move the grain rearwardly through a tubular extension 52 of the auger trough into a chamber or compartment 54 from which the grain is moved upwardly and into a front lower inlet 56 of a cleaning casing 58. This casing is coaxial with and rearwardly of the separator casing 40 and has a rear chaff discharge opening 60 and a cleaned grain outlet afforded by a generally semi-circular grate-like bottom 62. A second impeller 64 operates in the cleaning casing to clean grain by separating chaff therefrom so that the chaff is caused to exit through the chaff discharge opening 60, accelerated by blower means or a fan 66, in this instance mounted coaxially with the two impeller means 64 and 42; although, forced or draft air could be supplied by other means having locations differing from that shown. The coaxial arrangement does, however, have advantages from the standpoints of simplicity, compactness and convenience of drive. The grate-like bottom 62 of the impeller casing 58 is partitioned into two parts, 68 and 70, the former of which leads downwardly to cleaned-grain-receiving means in the form of a transverse auger trough 72, and the latter of which leads to a compartment 74 which leads via an auger tube 76 back to the chamber 54 for return to the cleaning casing 58 for re-cleaning. A transverse auger 78 in the trough 72 discharges at one end to the lower or boot end of a cleaned-grain conveyor 80 which has its upper end delivering in any suitable manner to a grain tank 82 carried by the combine body 32. The rear end of the separating and cleaning apparatus may be hooded at 84 to control the discharge of chaff. A short fore-and-aft auger 86 moves the grain from the compartment 74 to the chamber 54. Such grain is known as tailings and is returned, as stated above, to the cleaning casing 58 for recleaning and ultimately will find its way through the cleaned grain outlet 68 for delivery to the tank 82.

The separator impeller means 42 is journaled at its front and rear ends on appropriate bearings on front and rear walls 88 and 90, and a fore-and-aft tubular shaft 92 carries the impeller means for rotation on the axis established by the bearings. The shaft 92 continues rearwardly at 94 and the cleaning impeller means 64 is keyed thereto. Hence, the two impellers 42 and 64 rotate at the same speed and in the same direction.

The impeller means 42 has a front double-helical portion 96 and is provided rearwardly of this portion with a plurality of radial blades 98. As seen in FIG. 7, side walls 100 slope downwardly and inwardly to the auger trough 48 so as to confine the delivery of grain from the grate 46 to the trough 48.

The annular wall means of the casing may be regarded as including the grate means 46, which preferably has the arcuate or angular extent shown in FIG. 7, and the upper arcuate (here semi-cylindrical) imperforate wall part which completes the cylinder form of the casing. The outer edges of the blades 98 are relatively smooth and lie on a cylinder smaller than the casing cylinder so as to provide an annular space of uniform radial thickness within which the material is received and moved.

Axial movement of the material during separation is augmented by the provision of a continuous fixed helical bar or rib means 102 arranged coaxially with and interiorly of the casing 40 and having a relatively close clearance with the blades 98. In this case, the helical means is made up of a plurality of separate pieces to facilitate production and assembly. As respects the word "continuous," it is intended to include helical relationships in which interruptions are either minor or compensated for, as where the terminal end of one part of the helix may be axially offset from but will still circumferentially overlap the initial end of the next part of the helix. What is important is that the helix be so constructed as to keep the material moving relatively smoothly and uniformly, having due regard to the fact that it contains relatively large proportions of stems. The combination of the concentric casing 40, grate 46, bladed impeller and helix 102 has proven highly significant in handling a wide variety of material. In a workable embodiment of this machine, the above-mentioned annular clearance space is relatively small and, although it will of course vary with the diameters of the cylinder containing the inner edge of the helix and the cylinder on which the tips of the blades 98 lie, a good radial dimension of this space—or excess of the radius of the helix cylinder over that of the blade tips—would be in the range of .125" to 2.250", and even this range may be extended or contracted in cases in which the machine is designed to specialize in certain crops. But for a universal over-all machine, the above range will prove relatively reliable. The rear end of the helical bar means 102 terminates forwardly of the rear transverse upright wall 90, which coincides with the fore-and-aft dimension of the straw outlet 44. Likewise, the tubular extension 52 of the auger trough 48 traverses the discharge outlet 44. Hence, straw moved rearwardly by the impeller means 42 is deflected laterally in opposite directions by the wall 90 and the straw passes over the tubular extension 52. Stated otherwise, the auger trough 48 and its extension 52 by-passes the straw discharge for delivery of grain to the chamber 54, the wall 90 having a depending portion provided with an opening 104 coaxial with the tubular extension 52 and of course leading to the chamber 54.

The cleaning casing 58 carries interiorly thereof a fixed helical bar or rib means 106 for effecting axial rearward movement of the grain and chaff during the cleaning of the grain. This means, like the means 102, is continuous, although preferably made up of several parts for purposes noted. As indicated, the pitch of this helix may vary. Likewise, the spacing of the grate bars in the bottom section 68 may vary from the spacing of the grate bars in the bottom section 70, which will be evident from a comparison of that portion of the grate 62 in FIG. 8 with that portion of the grate 62 in FIG. 5, wherein it will be noted that the former is an assembly of grate bars more closely spaced apart than those in the section or part 70. These details of course may be varied. However, it will be found that the present design controls the incoming material in the sense that it confines it to a predetermined number of "passes" over the grate 68 before reaching the rear end of the cleaner. Each pass over the grate removes a certain per centum of grain from the chaff, and thus, by successive passes, the per centum of grain left in the chaff is reduced to a relatively low level in the final passes and the grain leaving the grate in this area is returned via the auger tube 76 for recleaning.

The impeller means 64 includes a rearward cylindrical extension 108 which closely surrounds the fan or blower means 66 and this is employed to confine the air flow through the cleaning means so as to obtain the most efficient discharge of chaff as well as to improve the cleaning of the grain by the separation of chaff therefrom. Another feature in this respect is the counter-rotation of the fan 66 relative to the two impeller means 42 and 64. For this purpose, the tubular shaft 92, on which the impeller means 42 and 64 are mounted, journals therewithin an elongated shaft 110 to which the fan 66 is keyed. The forward end of the tubular shaft 92 carries a pair of sprockets 112 and 114, and the shaft 110 projects farther forwardly than the tubular shaft 92 and has keyed thereto a sheave 116. The details of the drive will be discussed below.

The impeller 64 has a plurality of spokes 118 which carry a plurality of paddles 120 forwardly thereof and in the area of the cleaning casing inlet 56, as well as a plurality of larger paddles 122 which operate over the grate-like bottom 62. The grain auger 50 is mounted on a fore-and-aft tubular shaft 124 within which is journaled a shaft 126 which projects at its rear end to mount a paddle wheel or flipper 128 which serves as means for elevating the grain from the chamber 54 through the inlet 56 to the cleaning casing 58, whence it is picked up by the cooperation of the impeller means 64 with the helical means 106 for rearward movement to perform the cleaning function. Thus, the impeller means 42 and 64 rotate in the direction of the arrow 130, and the fan 66 rotates in the direction of the arrow 132. The auger 50 rotates in the direction of the arrow 134, and the flipper or paddle 128 rotates in the same direction. The tailings auger 86 rotates in the direction of the arrow 136 and moves tailings forwardly to the chamber 54 as opposed to rearward movement of grain to the chamber by the auger 50. The cleaned grain auger 78 rotates in the direction of the arrow 138, being mounted on a shaft 140 which is driven by a chain conveyor 142 within the cleaned grain elevator 80. The tailings auger 86 is mounted on a fore-and-aft shaft 144 and is driven from the end of the shaft 140, opposite to the grain elevator 80, by a sheave and belt system 146; although, the details of the particular drive are not limiting as respects the scope of the invention.

For purposes of illustration, the body 32 is shown as mounting an internal combustion engine 148 which ultimately establishes drive for the several components illustrated. For example, the engine may drive a large flat-belt pulley 150 at the side of the machine opposite to that shown in FIG. 1. This pulley is shown in FIGS. 10 and 11 and is keyed to a cross shaft 152 which, by means of a chain and sprocket arrangement 154 (FIG. 1), drives a shaft 156 on which the cylinder 34 is mounted. The shaft 152 carries at the end thereof, as seen in FIG. 1, a sheave 158 which, by means of a belt 160 and other appropriate mechanism, drives a chain and sprocket system 162 to the upper end of the grain conveyor 80. As previously indicated, the lower end of the chain conveyor 142 in the conveyor 80 drives the cross shaft 140 and thence drives the tailings auger 86.

As best shown in FIGS. 10 and 11, the drive shaft 152, by means of a chain and sprocket system 164, establishes drive to a gear box 166 from which a shaft 168 projects to carry a sprocket 170. A chain 172 is trained about this sprocket and about the sprocket 112 at the forward end of the shaft 92 for the impeller means 42 and 64. An external jack shaft 174 has keyed thereto a relatively large forward sprocket 176, and a chain 178 is trained about this sprocket, about a pair of idlers 180 and 182 and about the other sprocket 114 on the forward end of the tubular shaft 92. The idler 182 is in fact a driver for the fan shaft 110, and the wrap of the chain 178 about the sprocket 182 reverses the direction of that sprocket relative to that of the sprockets 112 and 114. The sprocket 182 is keyed to a shaft 184 which carries a variable-speed sheave 186 of any conventional type, and this sheave, by means of a belt 188, drives the sheave 116 that is keyed to the front end of the fan shaft 110. The directional arrow designations 130, 132 and 134 are applied in FIG. 11.

The cleaning casing 58 is provided with a pair of laterally outwardly extending air scoops 190 which provide for the entrance of air to the cleaning casing from below. This is best evident in FIG. 8, wherein it is seen that the scoops 190 respectively have downwardly converging bottom walls 192 so that air drawn into the tops of the scoops by the blower fan 66 follows the paths as indicated by the arrows 194, being drawn upwardly through the grate-like bottom 62 and into the impeller casing. The grain departing from the casing 62 as cleaned grain or tailings is of course heavier than the chaff and therefore will drop through the grate while the fan exhausts the chaff through the rear chaff discharge opening 60. The scoops 190 are isolated from the lateral straw discharge, the latter of which is indicated by the directional arrows 196 in FIG. 2. That is to say, straw separated from grain and moving rearwardly in the impeller casing 40 is deflected laterally by the front surface of the wall 90 to exit at 44 in the directions of the arrows 196. As seen in FIG. 2, the scoops 190 are rearwardly of the straw discharge and the upper portions of the scoops take in air at a level above that of the straw discharge. As shown in FIG. 8, the cleaned grain trough 72 has a lateral tubular extension 198 so that little if any air enters the cleaning casing other than via the scoops 190. Some air will of course enter at the separator casing inlet 38 but this air moves in the desired direction, since it is subject to the draft created by the fan 66.

As will be seen from the foregoing, the cleaning and separating apparatus is extremely simple and employs rotating parts to a minimum. This eliminates vibration and provides for simplification not only of the driving mechanism but of the separating and cleaning components themselves. Threshed straw entering the inlet at 38 is moved by the impeller means 42 over the semi-circular grate-like bottom 46 of the casing 40, and the axial rearward movement thereof is effected by the fixed helical bar 102. Grain separated from the straw is received by the auger trough 48 and is conveyed rearwardly through the tubular extension 52 and wall opening 104 to the flipper chamber 54, whence it is lifted to the cleaning casing 58. In the meantime, straw moved rearwardly by the impeller means 42 is discharged at 44 in the directions of the arrows 196 and is not re-commingled with the grain, since the tubular extension 52 on the auger trough 48 by-passes the straw discharge. As already described, the direction of rotation of the fan 66 is opposite to that of the impeller means 42 and 64, and the speed or rotation of the fan may be varied by the variable sheave means 186, which may be of any conventional construction and the details need not be enlarged upon here.

Likewise, the auger 50 and flipper or paddle 128 rotate in the same direction but at different speeds, which is effected by means of the fact that the auger and flipper are mounted on the separate shafts 124 and 126. The forward end of the tubular shaft 124 for the auger 50 has keyed thereto a sprocket 200, and a separate sprocket 202 is keyed to the forwardly projecting end of the flipper shaft 126. The jack shaft 174, previously described, carries a pair of sprockets 204 and 206. The smaller sprocket 204 is connected by a chain 208 to the relatively larger auger shaft sprocket 200 and another chain 210 connects the larger jack shaft sprocket 206 to the relatively smaller flipper shaft sprocket 202, thus producing the difference in speeds of rotation. The auger 50 thus moves the grain rearwardly and performs its conveying function, while the faster moving flipper 128 serves an elevating function in moving the grain to the cleaning casing 58 whence it is moved rearwardly by the combination of the paddles 120 and 122 on the impeller means 64 and the helical vanes 106 within the casing. The difference in fineness between the sections 68 and 70 of the cleaning grate 62 has been described before and need not be repeated. Suffice it to note that the section 68 delivers to the cleaned grain trough 72 and the other section 70 delivers tailings to the compartment 74 to be returned by the auger 86 to the flipper 128 and thence to the casing 58 for recleaning.

*Summary*

As will be seen, the present disclosure affords numerous improvements in cleaning and separating mechanisms operating on the centrifugal principle. Although the basic idea of centrifugal cleaning and separating is old, very little has been done by way of commercial exploitation, largely because of fundamental defects in the specific designs. Nevertheless, it should be recognized that mechanisms of this character have several advantages, most significant among which are that the rotating parts can be made smaller and therefore are more reliable at lower cost; the present trend is toward more capacity and larger machines, and centrifugal separation and cleaning can be adapted for these purposes; centrifugal cleaning and separating mechanisms are especially adapted for operation in combines utilized on hillside slopes, which partakes somewhat of the present trend to plant and harvest on areas that heretofore were considered impracticable.

The present invention relates to mechanism that more clearly than heretofore enables the exploitation of these trends and features. Among these is the increased ability of the cleaning and separating mechanism to handle incoming material, based largely upon the principle of smoothly and uniformly advancing the material by the spiral or helical ribs, 102 in the separating mechanism and 106 in the cleaning mechanism. That is to say, the incoming material is not merely dumped into the separating casing but is advanced as it enters. The grate, although here shown at the bottom of the casing, could be at the sides or even above, but in any event cooperates with the advance of material by the helical means so that the material is caused to advance in a prescribed path of a certain number of "passes" over the grate before reaching the discharge end. Each "pass" of the material over the grate removes a fixed percent of the grain and thus by successive passes, the percent of grain left in the chaff can be reduced to a suitable low level. In this respect, the varied pitch of the helix 106 is significant, it being noted that the pitch is greater at the front than at the rear. This is consonant with the fact that the amounts of material passing over the grate 68 in successive passes may be smaller, since, as stated, each pass removes a certain percent of grain and in subsequent passes the ratio of chaff to grain does not increase to the proportions that would occur with a fixed-pitch rib at 106. Consequently, the cleaning action, having regard to volume of material and air and capacity of the cleaning stage, becomes more efficient. Another advantage is that heavy material, other than grain, such as green weed stems and so forth, also makes the prescribed number of passes but is then automatically expelled at 196 and does not enter the cleaning stage. Allied with this feature is the use of air in the cleaning stage of a relatively low velocity. That is to say, if the moving air had a velocity high enough to carry out the green material, it would also carry out and thus waste the grain. Hence, the relationship of the air velocity to the green material is such that the green material is automatically expelled, which is desirable, because this material would contain little if any grain.

One distinct advantage of placing the ribs or helical bars on the casing rather than on the impeller, is that straight blades are permitted on the impeller and there is no pinching of material against obstructions as there would be in the case of an impeller in the form of an auger. Further, the radial dimension of the ribs can be made relatively small and the depths of the pockets between impeller blades can be made correspondingly large, thereby increasing capacity while assuring smooth and highly efficient action.

Another feature of importance is the relative sizes of the grates, which are here designed on the basis of present experience to minimize grain loss and to obtain maximum efficiency without unduly increasing the size of the apparatus. Because of the feature of advancing the material in a certain number of passes over the grate, a certain cleaning and separating function is obtained even in the separating part of the mechanism. Material returned to the front end of the cleaning stage is a relatively small amount, since it is already largely cleaned by virtue of passing through the separating stage. This has an advantage over returning the material to the front end of the separating stage, for there it would mingle with incoming unseparated material.

It should also be noted that, although the separating and cleaning mechanisms are shown in fore-and-aft alinement and disposed in fore-and-aft positions on the machine, this is merely a preferred construction, for location and disposition of these mechanisms is not a limiting factor. Hence, such expressions used in the specification as well as in the claims as "fore-and-aft," "bottom," "upright" etc. are used for purposes of convenience and clarity and primarily to facilitate directional lagnuage concerning movement of the material. In its broadest aspects, the invention is likewise not to be considered as limited to the situation in which the material returned from the cleaning stage must be elevated, as by the flipper 128. As will be clear from the scope of the claims, the separating stage can be used alone or in conjunction with the cleaning stage. On the basis of experience, the two, working together, accomplish the desired results in the separating and cleaning of the material with which the machine has been used.

Features of the invention in addition to those outlined above will readily occur to those versed in the art, as will many modifications and alterations in the preferred embodiments illustrated, all of which may be achieved without departure from the spirit and scope of the invention.

What is claimed is:

1. Apparatus for effecting the separation of grain from straw and the like and for cleaning the grain from chaff, comprising: a fore-and-aft separator casing having a front receiving end, a rear discharge end and a grate-like bottom: a conveyor trough beneath and paralleling said bottom and having a coaxial tubular extension rearwardly beyond said discharge end; transverse upright wall means rearwardly beyond said discharge end and having a depending portion intersecting said extension, said portion having an opening therein in register with said extension; means rearwardly of and in register with said opening and affording a chamber; a cleaning casing rearwardly of and generally in fore-and-aft alinement with the separator casing and separated from said separator casing by said wall means and having a lower inlet above and in register with the chamber and a grate-like bottom rearwardly of said inlet and at a level above the chamber and said cleaning casing having a rear chaff discharge opening; first impeller means in the separator casing and cooperative with the bottom of said separator casing to separate grain from straw and to cause grain to pass through said bottom and into said trough and to cause straw to move rearwardly toward said wall means to be deflected by said wall means laterally outwardly over the tubular extension of said trough; conveyor means in the trough for moving grain rearwardly into the chamber via said extension and wall means opening; means in the chamber operative to cause the grain to move upwardly through said inlet and into the cleaning casing; second impeller means in the cleaning casing and cooperative with the cleaning casing bottom to clean the grain by separation of chaff therefrom and to cause the cleaned grain to pass through said cleaning casing bottom; means below said cleaning casing bottom for receiving cleaned grain; and blower means operative to direct air through the cleaning casing for discharging chaff through said chaff discharge opening.

2. The invention defined in claim 1, including: a partition in the receiving means below the cleaning casing bottom so that a portion of the cleaning casing bottom is separated from the receiving means; and means in communication with and for receiving grain from said portion of the cleaning casing bottom and leading to and for returning grain to the cleaning casing.

3. The invention defined in claim 1, including: a rotatable fore-hand-aft tubular shaft extending from the separator casing means and through the wall means and into the cleaning casing means, and said first and second impeller means being mounted on and for rotation with said tubular shaft; a second shaft within and rotatable relative to the tubular shaft and having a rear part extending into the cleaning casing means rearwardly beyond the tubular shaft, and said blower means being mounted on and for rotation with said rear part of the second shaft.

4. The invention defined in claim 3, including: drive means connected to the shafts and operative to drive the tubular shaft at one speed and to drive the second shaft at a different speed.

5. The invention defined in claim 1, in which: the conveyor means is an auger having a central tubular shaft; the means in the chamber is a rotary element coaxial with the tubular shaft; and a second shaft extends through the tubular shaft and into the chamber and carries said rotary element.

6. The invention defined in claim 5, including: drive means connected to the shafts and operative to drive the tubular shaft at one speed and to drive the second shaft at a different speed.

7. The invention defined in claim 1, including: wall structure connected to and extending laterally from the cleaning casing and providing an air inlet leading incoming air upwardly through the cleaning casing bottom.

8. Apparatus for effecting the separation of grain from straw and the like and for cleaning the grain from chaff, comprising: a fore-hand-aft separator casing having a front receiving end, a rear discharge end and a grate-like bottom; a cleaning casing rearwardly of the separator casing and having a lower inlet, a grate-like bottom extending rearwardly from said inlet, and a discharge opening; means in the separator casing for effecting separation of grain from straw and for causing the grain to pass through said separator casing bottom and for causing straw to pass through the discharge end and outwardly between the two casings; conveyor means below and for receiving grain from the separator casing means bottom and leading to the cleaning casing means inlet in by-passing relation to straw discharged from the separator casing discharge end; means for elevating grain from the conveyor means to the cleaning casing via said inlet; means in the cleaning casing for cleaning said grain and causing cleaned grain to pass through the cleaning casing bottom and for causing chaff to exit through said discharge opening; and means for receiving cleaned grain from said cleaning casing bottom.

9. Apparatus for effecting the separation of grain from straw and the like and for cleaning the grain from chaff, comprising: a fore-and-aft separator casing having a front receiving end, a rear discharge end and grate-like bottom; a cleaning casing rearwardly of the separator casing and having a lower inlet, a grain outlet separate from said inlet, and a chaff outlet separate from said inlet and outlet; means in the separator casing for effecting separation of grain from straw and for causing the grain to pass through said separator casing bottom and for causing straw to pass through the discharge end and outwardly between the two casings; conveyor means below and for receiving grain from the separator casing means bottom and leading to the cleaning casing means inlet in by-passing relation to straw discharged from the separator casing discharge end; means for elevating grain from the conveyor means to the cleaning casing via said inlet; means in the cleaning casing for cleaning said grain and causing cleaned grain to pass through the grain outlet bottom and for causing chaff to exit through said chaff outlet; and means for receiving cleaned grain from said cleaning casing grain outlet.

10. Apparatus for effecting the separation of grain from straw and the like, comprising: a fore-and-aft separator casing having a front receiving end, a rear discharge end and a grate-like bottom; a cleaning casing rearwardly of the separator casing and having an inlet, a grain outlet separate from said inlet, and a chaff outlet separate from said inlet and outlet; means in the separator casing for effecting separation of grain from straw and for causing the grain to pass through said separator casing bottom and for causing straw to pass through the discharge end and outwardly between the two casings; conveyor means below and for receiving grain from the separator casing means bottom and leading to the cleaning casing in by-passing relation to straw discharged from the separator casing discharge end and in offset relation to said inlet; means for moving grain from the conveyor means to said inlet; means in the cleaning casing for cleaning said grain and causing cleaned grain to pass through the grain outlet and for causing chaff to exit through said chaff outlet; and means for receiving cleaned grain from said cleaning casing grain outlet.

11. The invention defined in claim 10, including: means in the cleaning casing for directing part of the cleaned grain to said outlet and for directing another part of said cleaned grain back to the inlet.

12. Apparatus for effecting the separation of grain from straw and the like and for cleaning the grain from chaff, comprising: a fore-and-aft separator casing having a front receiving end, a read discharge end and a grate-like bottom; a conveyor trough beneath and paralleling said bottom and disposed in by-passing relation to said discharge end; a cleaning casing separate from said discharge end and generally in fore-and-aft alinement with the separator casing and having inlet means depending into communication with the conveyor trough and further having a chaff outlet and a cleaned grain outlet; means in the inlet means for elevating grain from the trough to the cleaning casing; and means in the cleaning casing for cleaning grain and for causing cleaned grain and chaff to exit respectively through the cleaned grain and chaff outlets.

13. Apparatus for effecting the separation of grain from straw and the like and for cleaning the grain from chaff, comprising: a fore-and-aft cylindrical separator casing having a front receiving end, a rear end and a grain outlet from which grain is discharged radially from said casing, said rear end having a straw outlet; first impeller means coaxially rotatable in the casing for causing straw to move out of said straw outlet and grain to move radially from said grain outlet; a cleaning casing coaxially rearwardly of the separator casing and closed to said straw outlet and having an axially open rear chaff outlet, a radially inwardly directed grain inlet and a grain outlet from which cleaned grain is discharged radially; conveyor means radially offset from the two casings and leading from the separator casing grain outlet to the cleaning casing inlet and by-passing said straw outlet; and second impeller means coaxially rotatable in the cleaning casing to cause cleaned grain to exit radially through said cleaned grain outlet and chaff to exit through the chaff outlet.

14. The invention defined in claim 13, including: means coaxially interconnecting the two impeller means for rotation simultaneously.

15. The invention defined in claim 13, including: air inlet means shielded from the chaff outlet and from the straw outlet and leading to the cleaning casing via the cleaned grain outlet; and blower means for drawing air in through said air inlet means and for exhausting air through the chaff outlet.

16. The invention defined in claim 13, including: air inlet means shielded from the chaff outlet and from the straw outlet and leading to the cleaning casing via the cleaned grain outlet; and blower means disposed coaxially in the cleaning casing for drawing air in through said air inlet means and for exhausting air through the chaff outlet.

17. The invention defined in claim 16, including: means coaxial with the two impeller means for driving the blower means.

18. The invention defined in claim 13, including: means partitioning the cleaned grain outlet into first and second separate parts; first means for receiving grain from the outlet first part and for directing such grain away from said first part; and second means for receiving grain from the outlet second part and by-passing the first means for directing grain from said second part to the cleaning casing inlet.

19. Apparatus of the class described, comprising: a generally horizontal cylindrical casing having a bottom portion of its annular wall provided with grate means and having axially opposite ends, one of said ends serving as an inlet and the other of said ends serving as an outlet; impeller means coaxially journaled in the casing for rotation therein to rotate material over the grate means so that portions of such material exit through said grate means; means in the casing for causing the material to move axially in the casing from said inlet to said outlet as said material is rotated whereby other portions of the material exit at said outlet; and means for introducing material upwardly to said inlet.

20. Apparatus of the class described, comprising: a generally horizontal cylindrical casing having a bottom portion of its annular wall provided with grate means and having axially opposite ends, one of said ends serving as an inlet and the other of said ends serving as an outlet; impeller means coaxially journaled in the casing for rotation therein to rotate material over the grate means so that portions of such material exit through said grate means; means in the casing for causing the material to move axially in the casing from said inlet to said outlet as said material is rotated whereby other portions of the material exit at said outlet; and means for causing a current of air to flow upwardly through the grate means and out through the outlet.

21. Apparatus for separating grain from straw and the like, comprising a cylindrical casing having opposite ends and provided with annular wall means including a first arcuate imperforate part presenting a relatively smooth inner surface and a second arcuate part in the form of grate means extending axially as well as arcuately of the casing and having opposite ends respectively proximate to said ends of the casing, said grate means having radially innermost portions lying in substantially the same cylinder as said interior surface; impeller means coaxially journaled in the casing and including thereon a plurality of angularly spaced blades running axially of the casing and having relatively smooth outer edges uniformly inwardly radially spaced from the aforesaid cylinder to provide an annular space of uniform radial thickness between said cylinder and a cylinder including the outer edges of said blades, each blade having such length as to extend substantially from one end to the other of the grate means; means for driving the impeller means to rotate material within the casing and over said grate means; and helical rib means concentric with and secured to the casing within said annular space, the radial dimension of said rib means being only slightly less than the aforesaid thickness of said annular space so that the inner edge of the rib means has relatively close radial clearance with said outer edges of the blades, said rib means running continuously about said annular space for an axial distance substantially coextensive with the axial extent of the grate means and being operative in conjunction with rotation of the impeller to move grain and straw material continuously axially and angularly within the casing and over the grate means substantially free from axial obstruction by either the imperforate part or the grate means so as to cause the grain to depart from the casing via the grate means.

22. Apparatus for separating grain from straw and the like, comprising a cylindrical casing having opposite ends and provided with annular wall means including grate means extending axially as well as arcuately of the casing and having opposite ends respectively proximate to said ends of the casing; impeller means coaxially journaled in the casing and including thereon a plurality of angularly spaced blades running axially of the casing and having relatively smooth outer edges uniformly inwardly radially spaced from the interior of said wall means to provide an annular space of uniform radial thickness between said wall means and a cylinder including the outer edges of said blades, each blade having such length as to extend substantially from one end to the other of the grate means; means for driving the impeller means to rotate material within the casing and over said grate means; and helical rib means concentric with and secured to the casing within said annular space, the radial dimension of said rib means being only slightly less than the aforesaid thickness of said annular space so that the inner edge of the rib means has relatively close radial clearance with said outer edges of the blades, said rib means running continuously about said annular space for an axial distance substantially coextensive with the axial extent of the grate means and being operative in conjunction with rotation of the impeller to move grain and straw material continuously axially and angularly within the casing and over the grate means so as to cause the grain to depart from the casing via the grate means.

23. The invention defined in claim 22, in which: the casing wall means has a part at one end thereof extending axially beyond the grate means and said part has a discharge opening therein, and the impeller blades have portions that extend axially beyond the grate means and rib means and into said part, said blade portions being operative to cause discharge of straw through said opening.

24. The invention defined in claim 23, in which: the casing wall means at its opposite end extends axially beyond the grate means and has an inlet opening, the impeller extends into said opposite end of the casing and has spiral means thereon for causing grain and straw received in said inlet opening to be advanced toward the grate means and rib means.

25. Apparatus for effecting the separation of grain from straw and the like and for cleaning the grain from chaff, comprising: a separator casing having a receiving end, an opposite discharge end and wall means between said ends and including grate means; a conveyor trough outwardly of the casing and disposed to receive grain from the grate means and extending in by-passing relation to said discharge end; a cleaning casing generally alined with the separator casing and separate from said discharge end and having offset inlet means in communication with the conveyor trough and further having a chaff outlet and a cleaned grain outlet; means in the inlet means for transferring grain from the trough to the cleaning casing; and means in the cleaning casing for cleaning grain and for causing cleaned grain and chaff to exit respectively through the cleaned grain outlet and chaff outlet.

26. The invention defined in claim 25, including: an auger in the trough and having a tubular shaft; a second shaft extending through said tubular shaft into the inlet means; and a rotary element on said second shaft in the inlet means and constituting at least part of said means for transferring grain from the trough to the cleaning casing.

27. The invention defined in claim 26, including: drive means connected to the shafts and operative to drive the tubular shaft at one speed and to drive the second shaft at a different speed.

28. The invention defined in claim 25, including: an auger in the trough; a rotary element in the inlet for receiving grain from the auger and for moving grain to the cleaning casing; and drive means connected to the auger and rotary element for driving same at such speeds that the rotary element rotates faster than the auger.

29. The invention defined in claim 25, including: an auger in the trough and having a shaft; a rotary element in the inlet and having a shaft coaxial with the auger shaft; and one of said shafts being tubular and the other of said shafts extending through said one shaft.

30. The invention defined in claim 29, including: drive means connected to the shafts and operative to drive the shafts at such speeds that the rotary element rotates faster than the auger.

31. Apparatus for effecting the separation of grain from straw and the like, comprising: a separator casing having a receiving end and an opposite discharge end and wall means extending between said ends and including a grate; a cleaning casing adjacent to the separator casing and having an inlet, a grain outlet separate from said inlet, and a chaff outlet separate from said inlet and outlet; means in the separator casing for effecting separation of grain from straw and for causing the grain to pass through said grate and for causing straw to pass through the discharge end and outwardly between the two casings; conveyor means for receiving grain from the grate and leading to the cleaning casing in by-passing relation to straw discharged from the separator casing discharge end and in offset relation to said inlet; means for moving grain from the conveyor means to said inlet; means in the cleaning casing for cleaning said grain and causing cleaned grain to pass through the grain outlet and for causing chaff to exit through said chaff outlet; and means for receiving cleaned grain from said cleaning casing grain outlet.

32. The invention defined in claim 31, including: means in the cleaning casing for directing part of the cleaned grain to said grain outlet and for directing another part of said cleaned grain back to the inlet.

33. Apparatus for effecting the separation of grain from straw and the like, comprising: a separator casing having a receiving end and an opposite discharge end and wall means extending between said ends and including a grate; a cleaning casing having an inlet, a grain outlet separate from said inlet, and a chaff outlet separate from said inlet and outlet; means in the separator casing for effecting separation of grain from straw and for causing the grain to pass through said grate and for causing straw to pass through the discharge end and outwardly therefrom; conveyor means for receiving grain from the grate and leading to the cleaning casing in by-passing relation to straw discharged from the separator casing discharge end; means for moving grain from the conveyor means to said inlet; means in the cleaning casing for cleaning said grain and causing cleaned grain to pass through the grain outlet and for causing chaff to exit through said chaff outlet; and means for receiving cleaned grain from said cleaning casing grain outlet.

34. Apparatus for effecting the separation of grain from straw and the like, comprising: a separator casing having a receiving end and an opposite discharge end and wall means extending between said ends and including a grate; a cleaning casing having an inlet, a grain outlet separate from said inlet, and a chaff outlet separate from said inlet and outlet; means in the separator casing for effecting separation of grain from straw and for causing the grain to pass through said grate and for causing straw to pass through the discharge end and outwardly therefrom; conveyor means for receiving grain from the grate and having a grain delivery portion separated from the discharge end of the separator casing and operative to direct grain to the cleaning casing; means in the cleaning casing for cleaning said grain and causing cleaned grain to pass through the grain outlet and for causing chaff to exit through said chaff outlet; and means for receiving cleaned grain from said cleaning casing grain outlet.

35. Apparatus of the class described, comprising: a casing having opposite ends and an annular wall generated about an axis extending between said ends, one of said ends serving as an inlet end for grain and chaff, the other end serving as an outlet end for chaff, and said wall including a grate portion through which grain is discharged; an impeller journaled in the casing on said axis to rotate in said casing to separate grain from chaff and to cause grain to exit through the grate and to cause chaff to exit at said outlet end, said impeller having a central core and a plurality of generally radial blades thereon having outer ends adapted to travel relatively close to said wall as the impeller rotates, said blades having radially inner portions spaced radially outwardly from the core so as to leave a substantially annular air space between the core and blades; and means for causing air to flow through the grate and radially into the casing and into said air space and thence axially out through said outlet end to facilitate the exit of the chaff from the casing via said outlet end.

36. Apparatus for separating grain from straw and the like, comprising: a casing having a principal axis and including opposite ends spaced apart along said axis and an annular wall generated about said axis and having grate means extending axially as well as arcuately of the casing, said grate means having opposite ends respectively proximate to said ends of the casing; impeller means coaxially journaled in the casing and including thereon a plurality of angularly spaced blades running axially of the casing and having relatively smooth outer edges uniformly inwardly radially spaced from the interior of said wall means to provide an annular space of substantially uniform radial thickness between said wall means and the annular path generated by the outer edges of the impeller blades as the impeller rotates, each blade having such length as to extend substantially from end to end of the grate means; means for driving the impeller means to rotate material within the casing and over said grate means; and helical rib means concentric with and secured to the casing within said annular space, the radial dimension of said rib means being only slightly less than the aforesaid thickness of said annular space so that the inner edge of the rib means has relatively close radial clearance with said outer edges of the blades, said rib means running continuously about said annular space for an axial distance substantially coextensive with the axial extent of the grate means and being operative in conjunction with rotation of the impeller to move grain and straw material continuously axially and angularly within the casing and over the grate means so as to cause the grain to depart from the casing via the grate means.

37. The invention defined in claim 36, in which: the casing wall means has a part at one end thereof extending axially beyond the grate means and said part has a discharge opening therein, and the impeller blades have portions that extend axially beyond the grate means and rib means and into said part, said blade portions being operative to cause discharge of straw through said opening.

References Cited in the file of this patent

UNITED STATES PATENTS

| | | |
|---|---|---|
| 1,251,187 | Davis | Dec. 25, 1917 |
| 1,287,439 | Richmond | Dec. 10, 1918 |
| 1,413,758 | Milton | Apr. 25, 1922 |
| 1,770,792 | Lizamore | July 15, 1930 |
| 2,154,483 | Bedolla | Apr. 18, 1939 |
| 2,927,694 | Scranton | Mar. 8, 1960 |